United States Patent
Schumann et al.

(10) Patent No.: US 12,038,570 B2
(45) Date of Patent: Jul. 16, 2024

(54) MICROSCOPE AND METHOD FOR GENERATING AN OVERVIEW IMAGE OF A SAMPLE

(71) Applicant: Leica Microsystems CMS GmbH, Wetzlar (DE)

(72) Inventors: Christian Schumann, Lich (DE); Christian Schulz, Huettenberg (DE); Alexander Weiss, Linden (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 516 days.

(21) Appl. No.: 17/369,972

(22) Filed: Jul. 8, 2021

(65) Prior Publication Data
US 2022/0011561 A1    Jan. 13, 2022

(30) Foreign Application Priority Data
Jul. 10, 2020   (EP) ..................................... 20185147

(51) Int. Cl.
*G02B 21/33* (2006.01)
*G02B 21/00* (2006.01)

(52) U.S. Cl.
CPC .......... *G02B 21/33* (2013.01); *G02B 21/0048* (2013.01); *G02B 21/006* (2013.01)

(58) Field of Classification Search
CPC .. G02B 21/33; G02B 21/0048; G02B 21/006; G02B 21/00; G02B 21/0004; G02B 21/002; G02B 21/0032; G02B 21/0052; G02B 21/0072; G02B 21/0076; G02B 21/008; G02B 21/36; G02B 21/361; G02B 21/362; G02B 21/365; G02B 21/367

USPC ........ 359/368, 362, 363, 369, 381, 432, 434
See application file for complete search history.

(56) References Cited

U.S. PATENT DOCUMENTS

| 2015/0015942 A1 | 1/2015 | Steinmeyer et al. |
| 2020/0183141 A1 | 6/2020 | Ohrt et al. |
| 2021/0239961 A1* | 8/2021 | Haarstrich ......... G02B 21/0032 |

FOREIGN PATENT DOCUMENTS

| DE | 10 2006 042499 A1 | 3/2008 |
| DE | 10 2017 119093 A1 | 2/2019 |
| EP | 2 824 498 A1 | 1/2015 |
| JP | 2007515686 A * | 6/2007 |

(Continued)

*Primary Examiner* — Arnel C Lavarias
(74) *Attorney, Agent, or Firm* — LEYDIG, VOIT & MAYER, LTD.

(57) ABSTRACT

A microscope includes: an optical system including an immersion objective for an immersion medium of a predetermined refractive index; an aperture stop; and a processor for setting an immersion-free imaging mode in which the optical system is operated without immersion medium. The processor controls the aperture stop in the immersion-free imaging mode to set a numerical aperture of the immersion objective to a reduced value which is lower than a nominal value of the numerical aperture, the numerical aperture being equal to the nominal value when the optical system is operated using the immersion medium without reducing the numerical aperture by the aperture stop. The processor controls the optical system in accordance with the reduced value of the numerical aperture in the immersion-free imaging mode to generate at least one image representing the overview image of the sample.

17 Claims, 4 Drawing Sheets

(56) References Cited

FOREIGN PATENT DOCUMENTS

| JP | 2008058910 A | * | 3/2008 | |
|---|---|---|---|---|
| JP | 2008225096 A | * | 9/2008 | ......... G02B 21/0012 |

* cited by examiner

MICROSCOPE AND METHOD FOR GENERATING AN OVERVIEW IMAGE OF A SAMPLE

CROSS-REFERENCE TO PRIOR APPLICATION

Priority is claimed to European Patent Application No. EP 20185147, filed on Jul. 10, 2020, the entire disclosure of which is hereby incorporated by reference herein.

FIELD

The present invention relates to a microscope and a method for generating an overview image of a sample using a microscope.

BACKGROUND

In automatic microscopy, a fast generation of overview images of a sample for orientation purposes as well as an efficient microscopic imaging with high resolution, i.e. with a large numerical aperture (NA), are desirable. In biological microscopy, especially in life cell microscopy, the samples to be imaged are in an aqueous environment so that refractive index-adapted immersion objectives are used to achieve high numerical apertures with good spherical correction.

In conventional methods, a microscope stage holding the sample is moved in a lateral direction relative to an optical axis of the objective for creating a plurality of images which are combined into a mosaic-like overview image. If an immersion objective is used for creating the overview image, a film formed by an immersion medium between the front lens of the immersion objective and the sample carrier must be prevented from disrupting due to drag forces which are caused by the relative motion of the sample carrier and the front lens of the immersion objective. Especially in a case where a working distance between the front lens of the immersion objective and the sample is large, a velocity of the relative motion between the front lens of the immersion objective and the sample is limited. As a result, the imaging speed is limited correspondingly.

In order to avoid the above problem regarding a disruption of the immersion film, it may be envisaged to utilize a so-called dry objective for generating the overview image, such a dry objective being adapted to be operated without any immersion medium. However, a dry objective is not refractive-index adapted for imaging a sample in a liquid environment with a high numerical aperture so that the dry objective must be replaced with an immersion objective and an immersion medium must be applied before a high-resolution imaging can be performed.

SUMMARY

In an embodiment, the present invention provides a microscope, comprising: an optical system comprising an immersion objective which is configured for an immersion medium of a predetermined refractive index; an aperture stop; and a processor configured to set an immersion-free imaging mode in which the optical system is operated without immersion medium, wherein the processor is configured to control the aperture stop in the immersion-free imaging mode to set a numerical aperture of the immersion objective to a reduced value which is lower than a nominal value of the numerical aperture, the numerical aperture being equal to the nominal value when the optical system is operated using the immersion medium without reducing the numerical aperture by the aperture stop, and wherein the processor is configured to control the optical system in accordance with the reduced value of the numerical aperture in the immersion-free imaging mode to generate at least one image representing the overview image of the sample.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
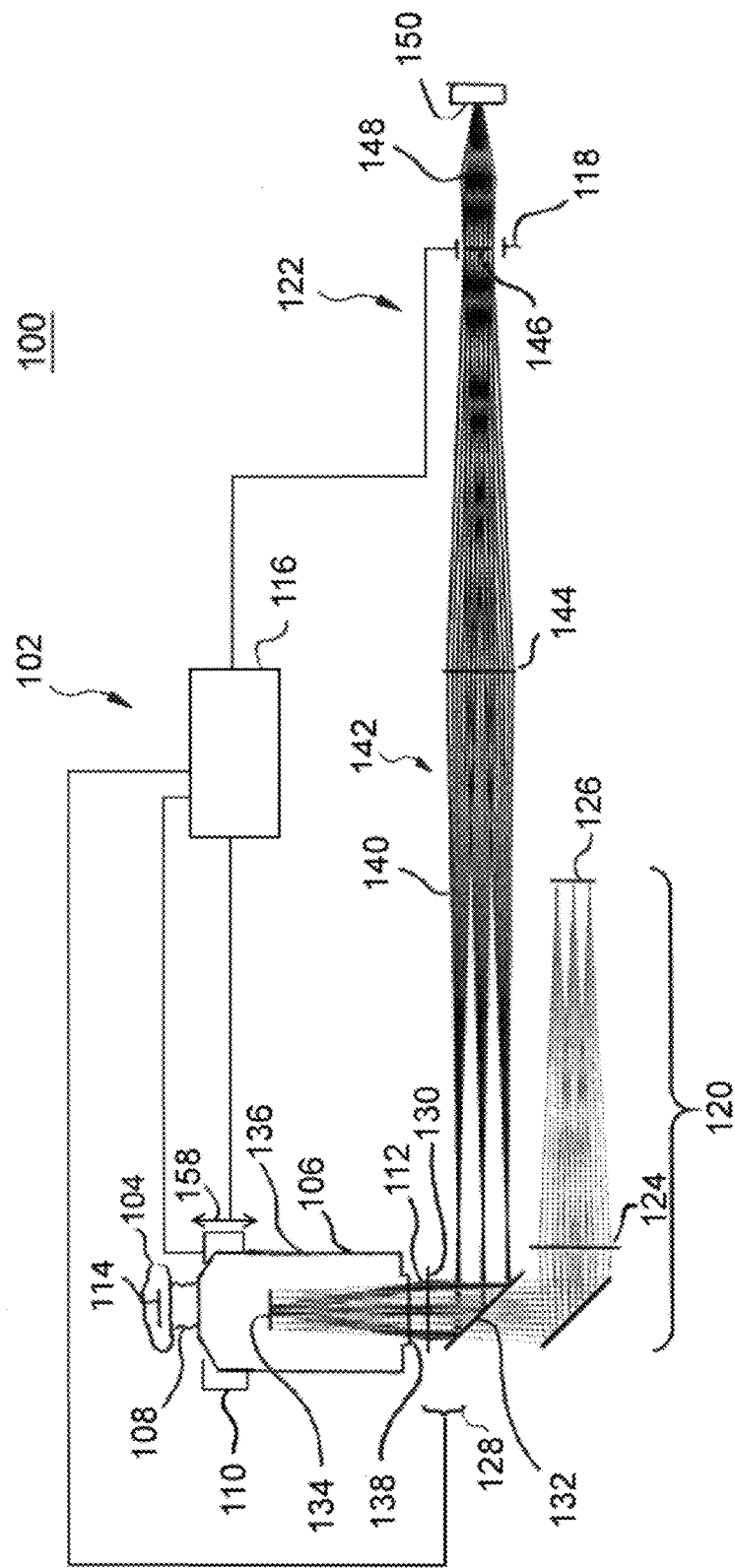
FIG. 1 is a schematic diagram showing a microscope according to an embodiment.

In an embodiment, the present invention provides a microscope and a method which allow to generate an overview image of a sample with high speed and good image quality.

A microscope comprises an optical system including an immersion objective which is designed for an immersion medium of a predetermined refractive index, an aperture stop, and a processor configured to set an immersion-free imaging mode in which the optical system is operated without immersion medium. The processor is further configured to control the aperture stop in the immersion-free imaging mode for setting a numerical aperture of the immersion objective to a reduced value which is lower than a nominal value of the numerical aperture, said numerical aperture being equal to the nominal value when the optical system is operated using the immersion medium without reducing the numerical aperture by means of the aperture stop. The processor is further configured to control the optical system in accordance with the reduced value of the numerical aperture in the immersion-free imaging mode to generate at least one image representing the overview image of the sample.

An immersion objective as disclosed herein is an objective which is configured and adapted to be operated with an immersion medium having a predetermined refractive index. Thus, the lens design of the immersion objective is corrected for aberrations, in particular for spherical aberration while taking into account the specific refractive index and the dispersion of the immersion medium intended for use with the objective.

The microscope is configured to use the immersion objective for generating an overview image as if it were a dry objective, i.e. an objective operated without any immersion medium. In order to still be able to produce overview images with good quality, an aperture stop is provided, and the aperture stop is controlled to reduce the numerical aperture of the immersion objective when being operated in the immersion-free imaging mode. Lowering the numerical aperture of the immersion objective allows to significantly reduce aberrations, especially spherical aberration, which would otherwise occur due to the absence of the immersion medium, bearing in mind that the lens design of the objective is optimized for use with the specific immersion medium. As a result, an overview imaging with high quality is possible.

Further, since the microscope is configured to be operated without any immersion medium, there is no need to limit the speed for moving the immersion objective and the sample in a lateral direction relative to each other in order to generate the overview image as a disruption of an immersion film cannot occur. As a result, fast overview imaging is possible.

In a preferred embodiment, the aperture stop has a variable opening degree, and the processor is configured to reduce the numerical aperture of the immersion objective by decreasing the opening degree of the aperture stop from a maximal opening degree, said numerical aperture being equal to the nominal value when the optical system is operated using the immersion medium and the aperture stop is set to the maximal opening degree. Varying the opening degree of the aperture stop in the immersion-free imaging mode allows the aberrations occurring due to the absence of the immersion medium to be reduced in a flexible manner.

It is not only the task of the aperture stop to reduce vignetting in the immersion-free imaging mode, thus homogenizing the image intensity. Furthermore, the aperture stop excludes high-aperture rays from image formation, which are severely affected by field-dependent aberrations such as astigmatism and coma, as well as symmetric aberrations such as spherical aberration due to refractive index mismatch which occurs when using an immersion objective in the immersion-free imaging mode. Thus, an appropriate size of the aperture stop reduces the wavefront error of imaging ray pencils and improves image quality and resolution in addition to the reduction of vignetting.

Preferably, the optical system includes a plurality of lens elements configured to interact with the immersion objective for optically imaging the sample selectively in a first operating mode in accordance with the nominal value of the numerical aperture and a second operating mode in accordance with the reduced value of the numerical aperture, said second operating mode representing the immersion-free imaging mode. The optical system comprises a first optical subsystem associated with the first operating mode, said first optical subsystem being configured to form a first image of the sample with a first field of view. The optical system comprises a second optical subsystem associated with the second operating mode, said second optical subsystem being configured to form at least one second image of the sample representing the overview image with a second field of view, said second field of view being larger than said first field of view. The second optical subsystem comprises an optical module insertable into an optical path extending from the immersion objective for selecting the second operating mode, said optical module comprising a lens element with positive refractive power causing the second field of view to be larger than the first field of view by being closer to an exit pupil of the immersion objective than the other lens elements of the optical system when inserted into the optical path.

According to this embodiment, two different operating states are provided which are used for imaging the sample in accordance with two field of views, i.e. two different magnifications. Specifically, the first operating mode may be used to provide a high magnification close-up image of a region of interest (ROI) which had been found before the actual image acquisition. In order to find this ROI, the second operating mode representing the immersion-free imaging mode may be used providing a low magnification overview image in which the ROI is included. Accordingly, the microscope enables a user to find an object to be imaged more easily. In particular, the user is not forced to change the objective so that correlation between the overview image and the high magnification image of the ROI is improved.

The avoidance of an objective change is particularly advantageous in configurations that deviate from the usual imaging configurations where the optical system is focused onto a plane parallel to the surface of the microscope stage. For instance, the microscope may be used advantageously in light sheet microscopes, e.g. oblique plane microscopes (OPM), in which the optical system is focused onto an object plane which is tilted relative to the surface of the microscope stage as illumination and detection need to be orthogonal to each other.

Further, the microscope is particularly suitable for imaging a complete microtiter cavity of a well plate comprising a plurality of such cavities. Thus, in a first step, a specific cavity may be imaged as a whole by applying the second operating mode, i.e. the immersion-free imaging mode in which image acquisition is performed based on a lower magnification. Subsequently, in a second step, the cavity thus found may be examined in detail by applying the first operating mode being based on a higher magnification.

Switching between the first and second operating modes is achieved by selectively inserting an optical module into the optical path, said optical module being a part of the second optical subsystem which is associated with the second operating mode. In other words, when the optical module is inserted into the optical path, the second operating mode is selected. In contrast, when the optical module is retracted from the optical path, the first operating mode is selected. Accordingly, by controlling the optical module, the user can easily switch between the two modes.

In order to create a large object field to be imaged in the second operating mode, the optical module comprises a lens element with positive refractive power. This positive lens element is positioned closer to an exit pupil of the immersion objective than the other lens elements of the optical system when the optical module is inserted into the optical path. Arranging the positive lens element of the optical module close to the exit pupil of the immersion objective ensures the detection light to be collected by the positive lens element at a location where field angles of the detection light are moderate, i.e. not too large. Accordingly, the size of the optical elements can be limited rendering the optical system compact. Specifically, there is no need to provide a very expensive immersion objective having an excessively high numerical aperture and a particularly long focal length in order to achieve a large object field. In contrast, the microscope allows to use an immersion objective having a reasonably high numerical aperture and being corrected for an infinite optical tube length, wherein the objective may have a moderate focal length which is advantageous in terms of compactness and costs.

The imaging device may comprise a suitable mechanism for inserting the optical module into the optical path and to remove it therefrom. For example, a motorized actuator may be provided for pivoting the module.

According to a preferred embodiment, the aperture stop is included in the second optical subsystem. Thus, when switching to the second optical subsystem, the aperture stop comes into action in order to reduce the numerical aperture of the immersion objective in the immersion-free imaging mode. For example, a motorized actuator may be provided for pivoting the module.

Preferably, the optical module further comprises a light deflector configured to branch an optical side path from the optical path when inserted into the optical path, said second image being formed in said optical side path. The aforementioned optical side path may be used in the immersion-free imaging mode as a separated optical path for creating the overview image which enables the user to find a distinct object, e.g. a specific microtiter cavity of a well plate, or a specific region of interest (ROI) of a larger object. In contrast, the optical path being effective in the first operating mode may be used to create a close-up image of the object determined in the first operating mode.

The second optical subsystem may comprise a Keplerian telescope system having a first, most object-side lens element being formed by said lens element with positive refractive power included in said optical module. Accordingly, by switching the optical module into the optical path, a telescope system is created which can be used for forming the overview image in the immersion-free imaging mode. In particular, when switching the optical module into the optical path, the first optical subsystem remains unchanged. As the first optical subsystem operates with higher magnification for achieving high quality imaging, it is more sensitive to any adjustment than the second optical subsystem. Therefore, it is advantageous to leave the first optical subsystem essentially unchanged when switching between the operating states. Accordingly, the microscope uses the movable optical module of the second optical subsystem for switching.

Preferably, the Keplerian telescope system is configured to form an image of the exit pupil. By using such a telescope being an afocal optical system having a real intermediate pupil, a number of options is provided for integrating additional optical components into the microscope. For example, components may be integrated which are used to implement epifluorescence illumination. Further, phase filters for implementing contrast methods may be integrated.

The aperture stop may be located at a position of the image of the exit pupil, said image being formed as a real image.

In a preferred embodiment, the microscope further comprises a dispenser configured to supply the immersion medium to the immersion objective and to remove the immersion medium therefrom.

The microscope may further comprise a focus adjustment device which is controlled by the processor to refocus the optical system for compensating a shift of a front focal length thereof caused by imaging the sample in the immersion-free imaging mode.

For instance, a free working distance of the immersion objective may be in a range from 300 µm to 4000 µm.

According to another aspect, a method is provided for generating an overview image of a sample using a microscope with an optical system comprising an immersion objective which is designed for an immersion medium of a predetermined refractive index. The method comprises the following steps: setting an immersion-free imaging mode in which the optical system of the microscope is operated without immersion medium, controlling an aperture stop of the microscope to set a numerical aperture of the immersion objective to a reduced value which is lower than a nominal value, said numerical aperture being equal to the nominal value when the microscope is operated using the immersion medium without reducing the numerical aperture by means of the aperture stop; and controlling the optical system of the microscope in accordance with the reduced value of the numerical aperture in the immersion-free imaging mode to generate at least one image representing the overview image of the sample.

The step of setting the immersion-free imaging mode may comprise a step of removing the immersion medium located between the sample and the immersion objective by means of an immersion dispenser.

In a preferred embodiment, the step of controlling the optical system in the immersion-free imaging mode to generate the overview image comprises a plurality of steps in which the sample and the immersion objective are successively shifted relative to each other in a direction lateral to an optical axis of the immersion objective, wherein an image is being generated in each step and the overview image is being composed of the plurality of images generated in the plurality of steps.

In a preferred embodiment, a velocity of shifting the sample and the immersion objective relative to each other in the direction lateral to the optical axis of the immersion objective exceeds a critical velocity for disruption of the immersion medium due to drag forces occurring when the immersion objective is used with the immersion medium.

Preferably, the step of controlling the microscope in the immersion-free imaging mode to generate the overview image comprises a step of increasing a field of view imaged by the immersion objective to a size which is larger than a nominal size of the field of view imaged in accordance with the nominal value of the numerical aperture.

In a preferred embodiment of the method, following steps are executed subsequent to the step of generating the overview image: supplying the immersion medium to the immersion objective; controlling the aperture stop to increase the numerical aperture of the immersion objective to the nominal value; and controlling the optical system to generate a close-up image of the sample in accordance with the nominal value of the numerical aperture. Here, the afore-mentioned step of controlling the aperture stop to increase the numerical aperture to the nominal value is to be understood widely in a sense e.g. covering an embodiment in which the optical system is switched into an operating mode where the aperture stop is ineffective, for example by branching into a different optical path.

FIG. 1 shows a microscope 100 comprising an optical system 102 which is configured to form an optical image of a sample 104. It is to be noted that FIG. 1 serves only for illustrating those features of the microscope 100 which may help to understand the operating principle of the microscope 100. Needless to say that the microscope 100 may comprise additional components not shown in FIG. 1.

The optical system 102 comprises an immersion objective 106 facing the sample 104 which is positioned on a sample carrier not shown in FIG. 1. The immersion objective 106 is adapted to be operated with an immersion medium 108 of a predetermined refractive index. Accordingly, the immersion objective 106 is specifically corrected for spherical aberration and chromatic aberration taking into account the refractive index and the dispersion of the immersion medium 108.

According to the specific embodiment shown in FIG. 1, the microscope 100 may comprise a dispenser 110 which is configured to supply the immersion medium 108 into a space between a front lens of the immersion objective 106 and the sample 104 as well as to remove the immersion medium 108 from this space.

The immersion objective 106 serves to collect detection light from the sample 104 and to focus the detection light into an optical path 112. In particular, the immersion objective 106 captures the detection light from a field of view 114 which is located in an object plane coincident with an object-side focal plane of the immersion objective 106. Thus, the immersion objective 106 forms an optical image of the field of view 114. The immersion objective 106 may be a lens commonly used for both illumination and detection. Accordingly, the microscope 100 may comprise additional optical components not shown in FIG. 1, these components being configured to feed the immersion objective 106 with light for illuminating the sample 104. Alternatively or additionally, the microscope 100 may comprise a separate optical arrangement for illuminating the sample 104.

The microscope 100 further comprises a processor 116 which may be configured to control an overall operation of the microscope 100. In particular, the processor 116 may be configured to selectively set one of at least two operating modes for imaging the sample 104 with different magnifications corresponding to fields of view of different sizes. A first operating mode of the microscope 100 represents a first imaging mode in which the optical system 102 is operated to generate a high-resolution image with a first magnification corresponding to a first field of view. A second operating mode of the microscope 100 represents a second imaging mode in which the optical system 102 is operated to generate an overview image with a second magnification corresponding to a second field of view, said second magnification being lower than the first magnification. Accordingly, the second field of view represented by the overview image is larger than the first field of view represented by the high-resolution image.

In the afore-mentioned first imaging mode, the optical system 102 is operated with the immersion medium 108 being present in the space between the immersion objective 106 and the sample 104. Thus, if not already present, the immersion medium 108 may be supplied by means of the dispenser 110 under control of the processor 116. In contrast, in the second imaging mode, the optical system 102 is operated without any immersion medium in order to provide an immersion-free imaging mode for creating the overview image.

In the immersion-free imaging mode, the processor 116 may control the optical system 102 to generate the overview image in a plurality of steps in which the sample 104 and the immersion objective 106 are successively shifted relative to each other in a direction lateral to an optical axis O of the immersion objective 106. In each step, a single image is generated, and the images are composed to an mosaic-like image array forming the overview image. In order to move the sample 104 and the immersion objective 106 relative to each other, a suitable motorized shifting device acting on the immersion objective 106 and/or the microscope stage may be provided.

To enable an overview imaging with good image quality, the microscope 100 comprises an aperture stop 118 which may be controlled by the processor 116 in the immersion-free imaging mode to set a numerical aperture of the immersion objective 106 to a reduced value which is lower than a nominal value of the numerical aperture. The numerical aperture of the immersion objective 106 is equal to the afore-mentioned nominal value when the optical system 102 is operated using the immersion medium 108 without reducing the numerical aperture by means of the aperture stop 118. By operating the optical system 102 in accordance with a reduced value of the numerical aperture in the immersion-free imaging mode, spherical aberration due to the absence of the immersion medium 108 can be significantly reduced. Therefore, a high-quality overview image can be achieved without requiring a time-consuming switch between the immersion objective 106 and a dedicated dry objective as applied in conventional approaches for overview imaging. Further, since there is no immersion medium present in the sample space, there is also no problem of a possible disruption of an immersion film when moving the immersion objective 106 and the sample 104 in a lateral direction relative to each other, i.e. perpendicular to an optical axis O of the immersion objective 106. As a result, overview imaging can be performed without any loss of speed caused by a possibly disrupting immersion film.

The optical system 102 includes a plurality of lens elements which are configured to interact with the immersion objective 106 for optically imaging the sample 104 selectively in the first operating mode representing the high-resolution imaging mode in accordance with the nominal value of the numerical aperture and for optically imaging the sample 104 in the second operating mode representing the immersion-free imaging mode in accordance with the reduced value of the numerical aperture. For this, the optical system 102 may comprise a first optical subsystem 120 associated with the first operating mode and a second optical subsystem 122 associated with the second operating mode. Accordingly, the first optical subsystem 120 is configured to form the high-resolution image of the sample 104 in accordance with the first magnification, i.e. the first field of view, and the second optical subsystem 122 is configured to form the overview image of the sample 104 in accordance with the second magnification, i.e. the second field of view.

According to the specific embodiment shown in FIG. 1, the first optical subsystem 120 associated with the first operating mode is formed by lens elements as commonly used in wide-field microscopy. These lens elements may e.g. include a tube lens 124 focusing an image created by the immersion objective 106 onto an image plane 126. The first optical subsystem 120 is depicted in simplified form in FIG. 1, and the first optical subsystem 120 may comprise additional optical components not shown in FIG. 1. For example, further lens elements may be provided to optically transport an intermediate image, which is created by the immersion objective 106 in the image plane 126, to an image sensor. Alternatively, an image sensor may be provided directly in the image plane 126. In any case, it is to be noted that any other optical configuration may be applied, which is suitable to cooperate with the immersion objective 106 for optically imaging the sample 104. Also, a scanning arrangement (e. g. a confocal scanner or multiphoton scanning arrangement) can be used to scan the image plane 126.

The second optical subsystem 122 associated with the second operating mode comprises an optical module 128 which is selectively insertable into the optical path 112. For this purpose, the optical module 128 may be formed by a pivotable optical component, and the microscope 100 may comprise a suitable mechanism configured to swivel the optical module 128 into the optical path 112 and retract it therefrom for switching between the first and second operating modes.

The optical module 128 includes a lens element 130 having positive refractive power. Further, the optical module 128 may comprise a light deflector 132 formed e.g. by a mirror. Being integrated in the optical module 128 the lens element 130 and the light deflector 132 are integrally pivotable into the optical path 112 and retractable therefrom when the optical module 128 is correspondingly moved for selectively switching between the first and second operating modes.

In the first operating mode, the optical module 128 is retracted from the optical path 112. Accordingly, the second optical subsystem 122 is switched inactive, and the first optical subsystem 120 is used for image acquisition in the first operating mode using the immersion medium 108. For this purpose, the first optical subsystem 120 interacts with the immersion objective 106 in order to form the high-resolution image in accordance with the first magnification, i.e. in accordance with the first field of view. Specifically, according to the configuration of FIG. 1, the high-resolution image is created in the image plane 126. This image may be a high magnification close-up image of a selected region of interest (ROI).

In the second operating mode representing the immersion-free imaging mode, the immersion medium 108 is removed from the space between the immersion objective 106 and the sample 104, and the optical module 128 is inserted into the optical path 112. Further, the processor 116 controls the aperture stop 118 to reduce the numerical aperture of the immersion objective 106 by decreasing an opening degree of the aperture stop 118 from a maximal opening degree. It is to be noted that the numerical aperture is equal to the nominal value when the optical system 102 is operated with the immersion medium 108 and the aperture stop 118 is set to its maximal opening degree. As explained above, by decreasing the opening degree of the aperture stop 118 spherical aberration can be prevented from occurring when the immersion medium 108 is removed from the sample space.

In the immersion-free imaging mode, the light deflector 132 prevents the detection light propagating along the optical path 112 from transmitting to the first optical subsystem 120, and the first optical subsystem 120 is switched inactive. Rather, the second optical subsystem 122 is switched active in the immersion-free imaging mode wherein the second optical subsystem 122 interacts with the immersion objective 106 to create the overview image in accordance with the second field of view. As already mentioned above, the second field of view used in the immersion-free imaging mode can be applied to find a suitable ROI.

As can be seen from FIG. 1, in case that the optical module 128 is inserted into the optical path 112, the lens element 130 integrated with the optical module 128 is closer to the immersion objective 106 than any other lens element being included in the optical system 102. In particular, the lens element 130 is positioned as close as possible to an exit pupil 134 of the immersion objective 106. According to the specific embodiment shown in FIG. 1, the exit pupil 134 is located within a housing 136 of the immersion objective 106. Accordingly, the lens element 130 of the optical module 128 is positioned as close as possible to an end surface 138 of the housing 136, possibly taking into account any focusing movement of the immersion objective 106 relative to the sample 104 varying the distance between the end surface 138 of the housing 136 and the lens element 130.

Since the positive lens element 130 is positioned at a short axial distance from to the exit pupil 134 of the immersion objective 106, the detection light is collected by the lens element 130 at a location where the lateral spread of the light bundles caused by the large field angles of the detection light are relatively small. Thus, the lens element 130 can be made correspondingly small. In particular, it is not necessary to use a very expensive objective with a large focal length.

As can be seen in FIG. 1, the light deflector 132 branches an optical side path 140 from the optical path 112 leading from the exit pupil 134 of the immersion objective 106 to the light deflector 132. The optical side path 140 may be considered as an optical overview path used in the immersion-free imaging mode for creating the low magnification overview image. In contrast, without branching off the optical side path 140, the optical path 112 as a whole may be considered as an optical main path used in the first operating mode for creating the high-resolution close-up image.

According to the specific embodiment shown in FIG. 1, the second optical subsystem 122 comprises a Keplerian telescope system 142 including two lens elements, each of which having positive refractive power. A first of these two lens elements is formed by the lens element 130 being part of the optical module 128. A second lens elements of the telescope system 142 is formed by an element 144 located downstream of lens element 130 along the optical side path 140. In words, when inserting the optical module 128 into the optical path 112, the lens elements 130 and 144 are combined to form the Keplerian telescope system 142 which is switched active in the immersion-free imaging mode.

The Keplerian telescope system 142 is configured to form a real image 146 of the exit pupil 134 of the immersion objective 106 in the optical side path 140. Specifically, the real image 146 of the exit pupil 134 is created downstream of the second lens element 144 of the Keplerian telescope system 140.

In the specific embodiment shown in FIG. 1, the aperture stop 118 is located in a position of the real image 146 of the exit pupil 134. Specifically, the aperture stop 118 is used to stop down the imaged exit pupil 134 of the immersion objective 106. Thus, detrimental effects caused by vignetting or aberrations occurring in the immersion objective 106 at large field angles can be prevented from occurring in the optical side path 136.

Further, along the optical side path 140 downstream of the aperture stop 114, the second optical subsystem 122 may include a tube lens 148 and an image sensor 150. The tube lens 148 is configured to focus the detection light propagating through the optical side path 140 onto the image sensor 150, thus forming the overview image in the immersion-free imaging mode.

The configuration shown in FIG. 1 provides for an additional infinity optical path between the Keplerian telescope system 142 and the tube lens 148, said additional infinity optical path comprising a real intermediate pupil in form of the real image 146 of the exit pupil 134. The additional infinity optical path may be used for integrating additional optical components into the microscope 100, e.g. components for epifluorescence illumination, phase filters, phase modulators, etc.

In this respect, it is to be noted that the optical path 112 leading from the immersion objective 106 to the first optical subsystem 120 forms an infinity optical path, likewise. However, this infinite optically path is (at least in part) associated with both the first and second operating modes. Thus, it shall not be utilized for incorporating optical components exclusively determined for performing the second operating mode.

As already mentioned above, in the immersion-free imaging mode, the processor 116 causes the aperture stop to set the numerical aperture of the immersion objective 106 to a reduced value being lower than the nominal value. Thus, an overview imaging with low aberration can be achieved. The reduced value of the numerical aperture may by determined to satisfy following condition (1):

$$\frac{30n_1^4 \cdot (n_1^2 - n_0^2)^2 + 15NA^2 n_1^2 \cdot (n_1^2 - n_0^2)^2 + 2NA^4 n_1^2 \cdot (n_1^2 - 2n_0^2)}{n_1^6 \cdot [10800 \cdot (NA^4(n_0^4 + n_1^4) + 16n_0^4 n_1^4) + 5760 \cdot (NA^6 + 15NA^2 n_0^2 n_1^2)(n_0^2 + n_1^2) + 44640 \cdot NA^4 n_0^2 n_1^2 + 768 \cdot NA^8]} \cdot \left(\frac{d_0}{\lambda}\right)^2 \leq A$$

Condition (1) describes the mean square wave front error in an optimal adjustment plane in lowest spherical approximation. Such an approximation is justified since the reduced value of the numerical aperture is expected to be small. In condition (1), $n_0$ designates the predetermined refractive index of the immersion medium 108 based on which the immersion objective 106 is designed, $n_1$ designates the refractive index of air, $\lambda$ designates the wavelength of the detection light, and $d_0$ designates a front focal distance or a free working distance of the immersion objective 106. Preferably, a value A is equal to ln $2/4\pi^2$ corresponding the value of 50% of the definition brightness according to Strehl (also known as Strehl ratio). A value of A of ln $4/4\pi^2$ corresponding to a definition brightness 0.25 may also be suitable.

It is to be noted that light refraction on an outer surface of the front lens of the immersion objective 106 varies depending on whether the microscope 100 is operated in the first or second operating mode, i.e. whether imaging is performed with or without the immersion medium 108. As a result, a shift $\Delta z$ of the front focal distance of the immersion objective 106 along the optical axis O may occur between the first operating mode and the second operating mode as illustrated in FIGS. 2 and 3.

Figure 2:
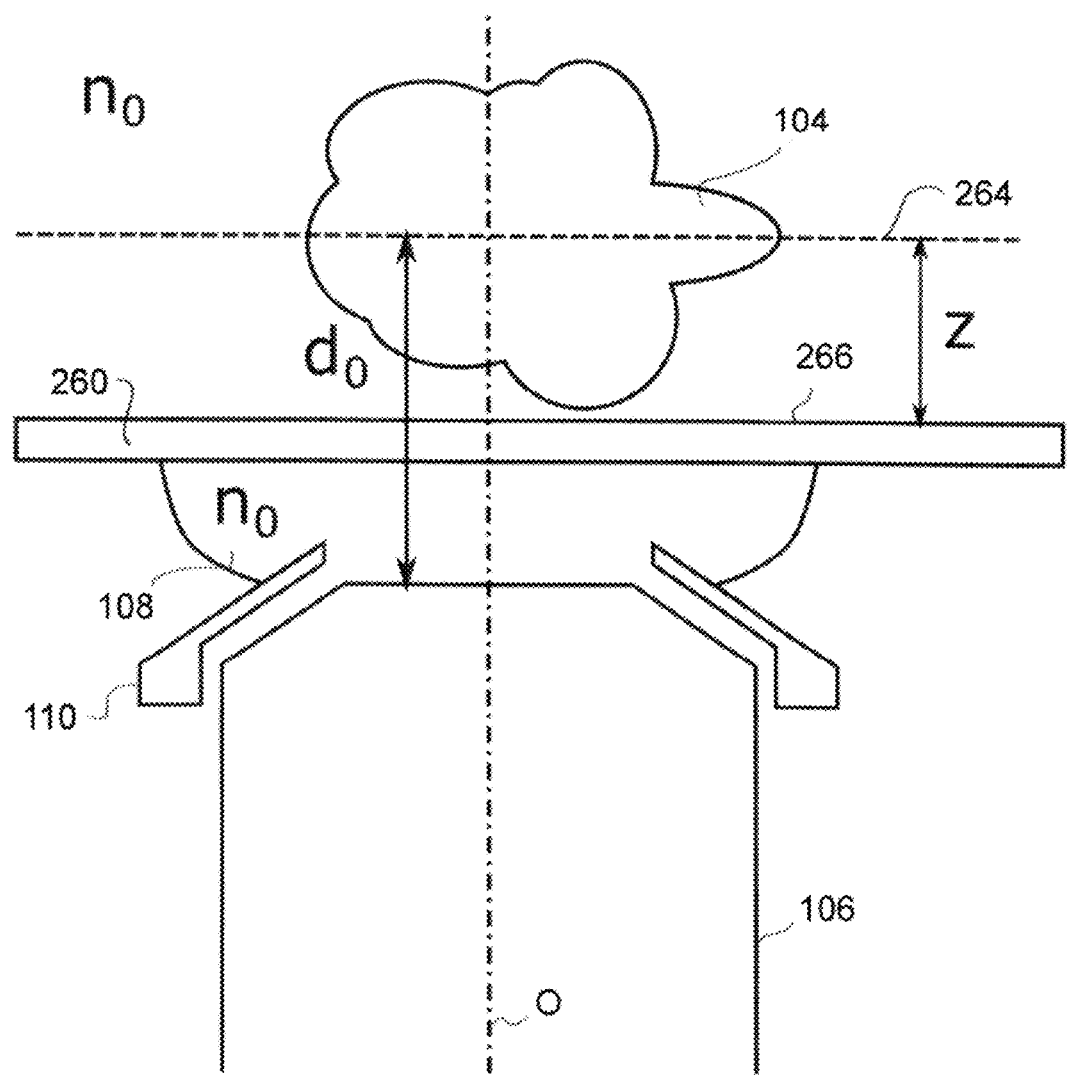
FIG. 2 is a schematic diagram showing an immersion objective of the microscope when being operated with an immersion medium to generate a high-resolution image of a sample.

FIG. 2 illustrates the first operating mode in which the immersion medium 108 of the refractive index $n_0$ is present between the immersion objective 106 and a sample carrier 260 on which the sample 104 is located. In contrast, FIG. 3 illustrates the second operating mode in which the immersion medium 108 is removed from the sample space so that the refractive index $n_1$ of air becomes effective.

Figure 3:
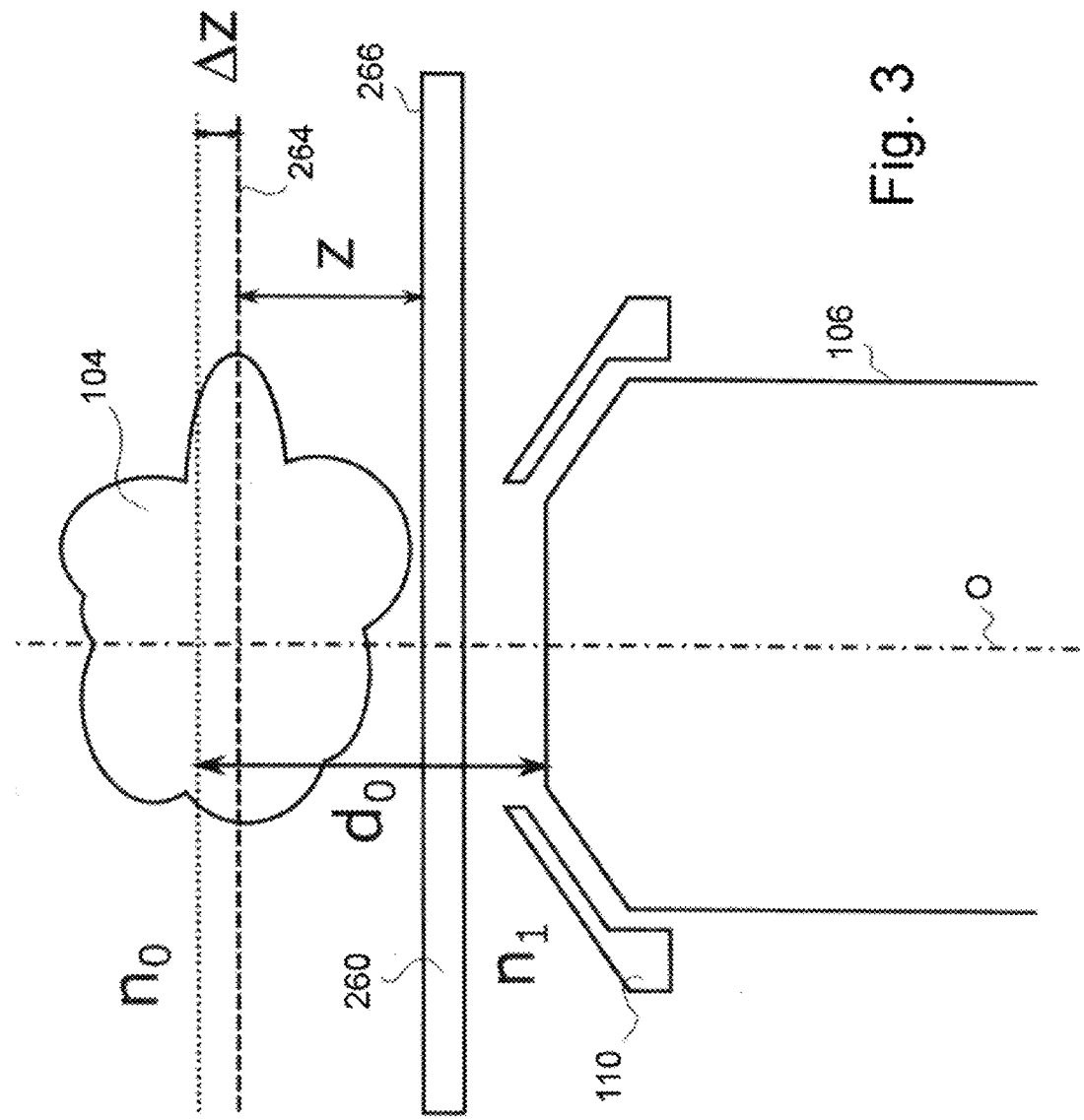
FIG. 3 is a schematic diagram showing the immersion objective of the microscope when being operated without an immersion medium to generate an overview image.

Further, in FIGS. 2 and 3, z designates a physical distance from a focal plane 264 of the immersion objective 106 to an interface 266 between the sample carrier 260 and the sample 104.

According to an approximation of zero order, the axial shift $\Delta z$ of the front focal distance of the immersion objective 106 may be determined by equation (2):

$$\Delta z = \frac{n_0}{n_1}(d_0 - z)$$

A more precise approximation of first order is given by equation (3):

$$\frac{60 \cdot n_0^3 n_1^4 + 30 \cdot NA^2 n_0^3 n_1^2 + 4 \cdot NA^4 n_0^3}{(60 \cdot n_0^2 + 15 \cdot NA^2) n_1^5 + (15 \cdot NA^2 n_0^2 + 4 \cdot NA^4) n_1^3}(d_0 - z)$$

Based on condition (2) or condition (3), the optical system 102 may be refocused to compensate the shift $\Delta z$ of the front focal distance when switching from the first to the second imaging mode and vice versa. For this, the microscope 100 may be provided with a focus adjustment device 158 as schematically depicted in FIG. 1.

Figure 4:
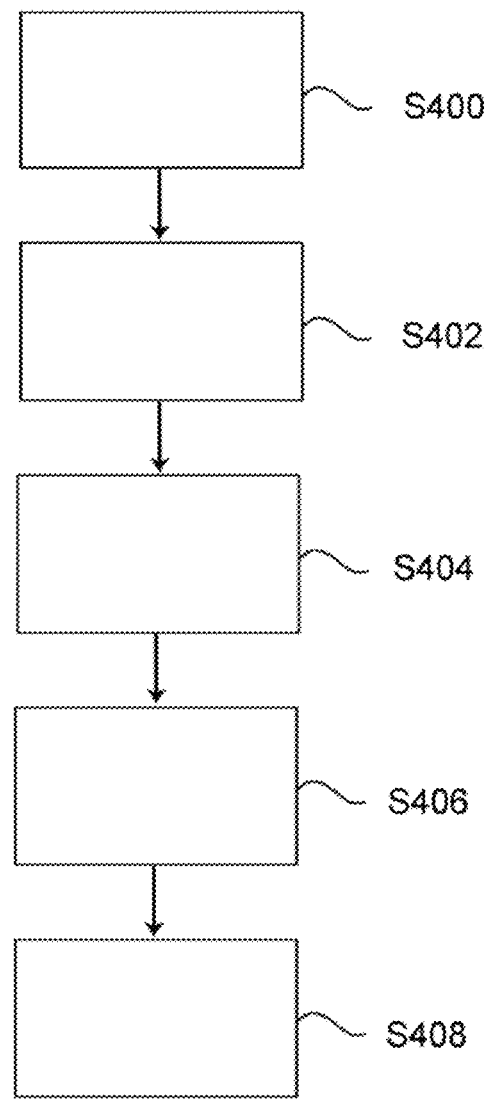
FIG. 4 is a flow diagram illustrating a method for operating the microscope according to an embodiment.

A method for operating the microscope 100 is exemplified by a flow diagram shown in FIG. 4.

In step S400, if present, any immersion medium 108 located between the sample 104 and the immersion objective 106 is removed. For this, the processor 116 may actuate the dispenser 110 to draw the immersion medium from the sample space and to store it in a reservoir or discard it. Needless to say that step S400 may not be necessary when the imaging process is just started.

In step S402, the processor 116 sets the immersion-free imaging mode. For this, the processor 116 may cause the optical module 128 to be inserted into the optical path 112 so that the second optical subsystem 122 comes into action. Further, the processor 116 controls the aperture stop 118 to set the numerical aperture of the immersion objective 106 to the afore-mentioned reduced value, e.g. in accordance with condition (1). In this respect, it is to be noted that the size of the aperture stop 118 can also be fixed. In other words, the reduction of the numerical aperture is achieved simply by activating the aperture stop 118 in the immersion-free imaging mode.

In step S404, the processor 116 controls the optical system 102 to generate an overview image of the sample 104 in accordance with the reduced value of the numerical aperture set in step S402. For this, a plurality of images may be generated while successively shifting the sample 104 and the immersion objective 106 relative to each other in a direction lateral to the optical axis O and combining the images to a mosaic-like image array forming the overview image. As there is no immersion medium present in the sample space in step S404, a velocity of shifting the sample 104 relative to the immersion objective 106 may well exceed a critical velocity for immersion film disruption possibly occurring in conventional imaging methods.

In step S406, the processor 116 sets the high-resolution imaging mode. For this, the processor 116 may retract the optical module 128 from the optical path 112 so that the first optical subsystem 120 comes into action, and the aperture stop 118 provided in the second optical subsystem 122 is deactivated. Accordingly, the numerical aperture of the immersion objective is enlarged to the nominal value. Further, the processor 116 controls the dispenser 110 to supply the immersion medium 108 into the sample space. Further, the processor (116) may control the focus adjustment device 158 for refocusing the optical system 102, i.e. to compensate the shift $\Delta z$ of the front focal distance as explained above with reference to FIGS. 2 and 3.

Finally, in step S408, the processor 116 causes the optical system 102 to generate a high-resolution image of the sample 104 as explained above.

The embodiments described above are to be understood merely as non-limiting examples, and a variety of modifications may be considered. For instance, according to the embodiment shown in FIG. 1, the aperture stop 118 is formed by an element which is separated from the immersion objective 106. However, the aperture stop may also be included in the immersion objective 106 in order to reduce and enlarge the numerical aperture of the immersion objective 106 in accordance with the different imaging modes.

The technical solution disclosed herein may be applied to microscopes of different types including e.g. light sheet microscopes, in particular oblique plane microscopes using one single objective both for illumination and detection.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100 microscope
102 optical system
104 sample
106 immersion objective
108 immersion medium
110 dispenser
112 optical path
114 field of view
116 processor
118 aperture stop
120 first optical subsystem
122 second optical subsystem
124 tube lens
126 image plane
128 optical module
130 lens element
132 light deflector
134 exit pupil
136 housing
138 end surface
140 optical side path
142 telescope system
144 lens element
146 real image
148 tube lens
150 image sensor
260 sample carrier
264 focal plane
266 interface
O optical axis
z physical distance
$\Delta z$ axial shift
$n_0$ refractive index
$n_1$ refractive index
$d_0$ front focal distance

What is claimed is:

1. A microscope, comprising:
an optical system comprising an immersion objective which is configured for an immersion medium of a predetermined refractive index;
an aperture stop; and
a processor configured to set an immersion-free imaging mode in which the optical system is operated without immersion medium,
wherein the processor is configured to control the aperture stop in the immersion-free imaging mode to set a numerical aperture of the immersion objective to a reduced value which is lower than a nominal value of the numerical aperture, the numerical aperture being equal to the nominal value when the optical system is operated using the immersion medium without reducing the numerical aperture by the aperture stop, and
wherein the processor is configured to control the optical system in accordance with the reduced value of the numerical aperture in the immersion-free imaging mode to generate at least one image representing an overview image of the sample.

2. The microscope of claim 1, wherein the aperture stop has a variable opening degree, and
wherein the processor is configured to reduce the numerical aperture of the immersion objective by decreasing the opening degree of the aperture stop from a maximal opening degree, the numerical aperture being equal to the nominal value when the optical system is operated using the immersion medium and the aperture stop is set to the maximal opening degree.

3. The microscope of claim 1, wherein the optical system includes a plurality of lens elements configured to interact with the immersion objective to optically image the sample selectively in a first operating mode in accordance with the nominal value of the numerical aperture and a second operating mode in accordance with the reduced value of the numerical aperture, the second operating mode representing the immersion-free imaging mode,
wherein the optical system comprises a first optical subsystem associated with the first operating mode, the first optical subsystem being configured to form a first image of the sample with a first field of view,
wherein the optical system comprises a second optical subsystem associated with the second operating mode, the second optical subsystem being configured to form at least one second image of the sample representing the overview image with a second field of view, the second field of view being larger than the first field of view, and
wherein the second optical subsystem comprises an optical module insertable into an optical path extending from the immersion objective to select the second operating mode, the optical module comprising a lens element with positive refractive power configured to cause the second field of view to be larger than the first field of view by being closer to an exit pupil of the immersion objective than other lens elements of the optical system when inserted into the optical path.

4. The microscope of claim 3, wherein the aperture stop is included in the second optical subsystem.

5. The microscope of claim 3, wherein the optical module further comprises a light deflector configured to branch an optical side path from the optical path when inserted into the optical path, the second image being formed in the optical side path.

6. The microscope of claim 3, wherein the second optical subsystem comprises a Keplerian telescope system having a first, most object-side lens element being formed by the lens element with positive refractive power included in the optical module.

7. The microscope of claim 6, wherein the Keplerian telescope system is configured to form an image of the exit pupil.

8. The microscope of claim 7, wherein the aperture stop is located at a position of the image of the exit pupil, the image being formed as a real image.

9. The microscope of claim 1, further comprising:
a dispenser configured to supply the immersion medium to the immersion objective and to remove the immersion medium therefrom.

10. The microscope of claim 1, further comprising:
a focus adjustment device which is controlled by the processor to refocus the optical system to compensate for a shift of a front focal distance thereof caused by imaging the sample in the immersion-free imaging mode.

11. The microscope of claim 1, wherein a free working distance (FWD) of the immersion objective is in a range from 300 μm to 4000 μm.

12. A method for generating an overview image of a sample using a microscope with an optical system comprising an immersion objective for an immersion medium of a predetermined refractive index, the method comprising:
setting an immersion-free imaging mode in which the optical system of the microscope is operated without immersion medium;
controlling an aperture stop of the microscope to set a numerical aperture of the immersion objective to a reduced value which is lower than a nominal value, the numerical aperture being equal to the nominal value when the microscope is operated using the immersion medium without reducing the numerical aperture by the aperture stop; and
controlling the optical system of the microscope in accordance with the reduced value of the numerical aperture in the immersion-free imaging mode to generate at least one image representing the overview image of the sample.

13. The method of claim 12, wherein setting the immersion-free imaging mode comprises removing the immersion medium located between the sample and the immersion objective by an immersion dispenser.

14. The method of claim 12, wherein controlling of the optical system in the immersion-free imaging mode to generate the overview image comprises a plurality of steps in which the sample and the immersion objective are successively shifted relative to each other in a direction lateral to an optical axis of the immersion objective, and an image is generate in each of the plurality of steps to create a plurality of images,
wherein the overview image is composed of the plurality of images generated in the plurality of steps.

15. The method of claim 14, wherein a velocity of shifting the sample and the immersion objective relative to each other in the direction lateral to the optical axis of the immersion objective exceeds a critical velocity for disruption of a film formed by the immersion medium due to drag forces occurring when used with the immersion medium.

16. The method of claim 12, wherein controlling the microscope in the immersion-free imaging mode to generate the overview image comprises increasing a field of view imaged by the immersion objective to a size which is larger than a nominal size of the field of view imaged in accordance with the nominal value of the numerical aperture.

17. The method of claim 12, further comprising, after generating the overview image:
supplying the immersion medium to the immersion objective;
controlling the aperture stop to increase the numerical aperture of the immersion objective to the nominal value; and
controlling the optical system to generate a close-up image of the sample in accordance with the nominal value of the numerical aperture.

* * * * *